Figure 5:
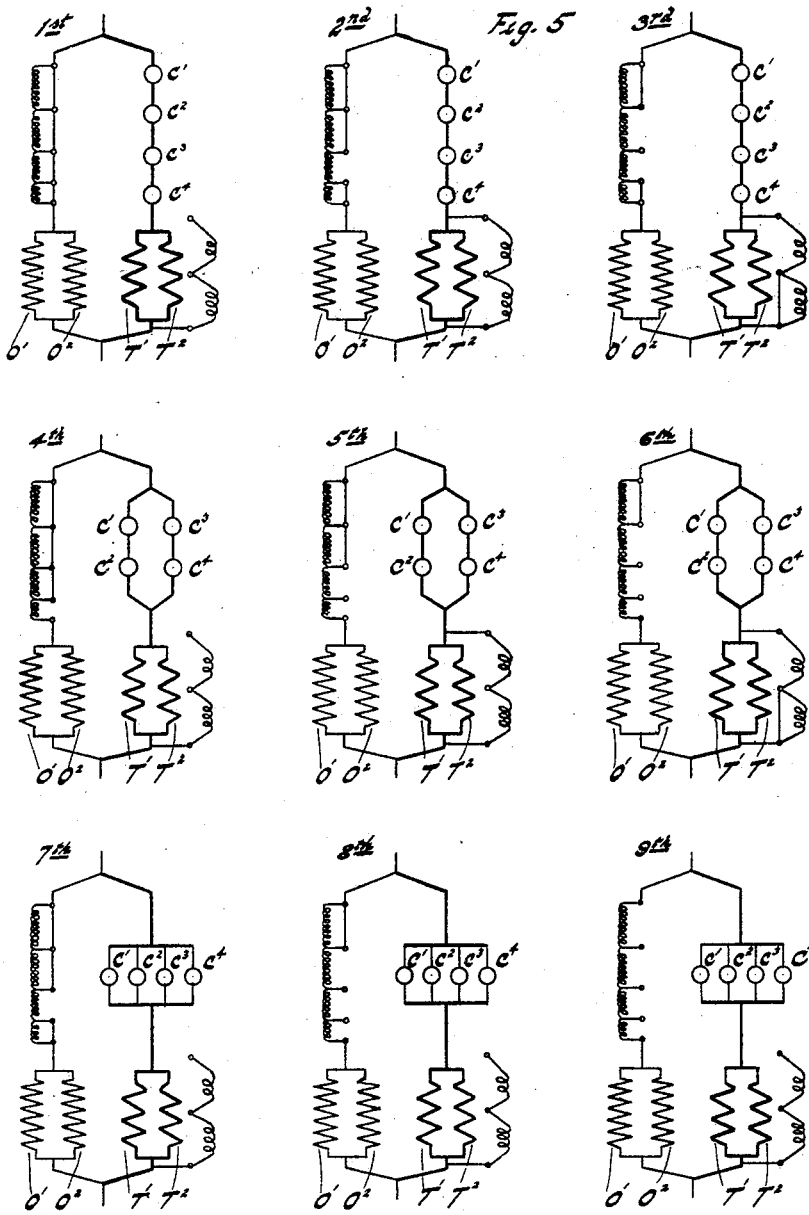

No. 626,178.  
Patented May 30, 1899.  
R. LUNDELL.  
METHOD OF AND MEANS FOR REGULATING ELECTRIC MOTORS.  
(Application filed Mar. 3, 1899.)  
(No Model.)  
2 Sheets—Sheet 1.
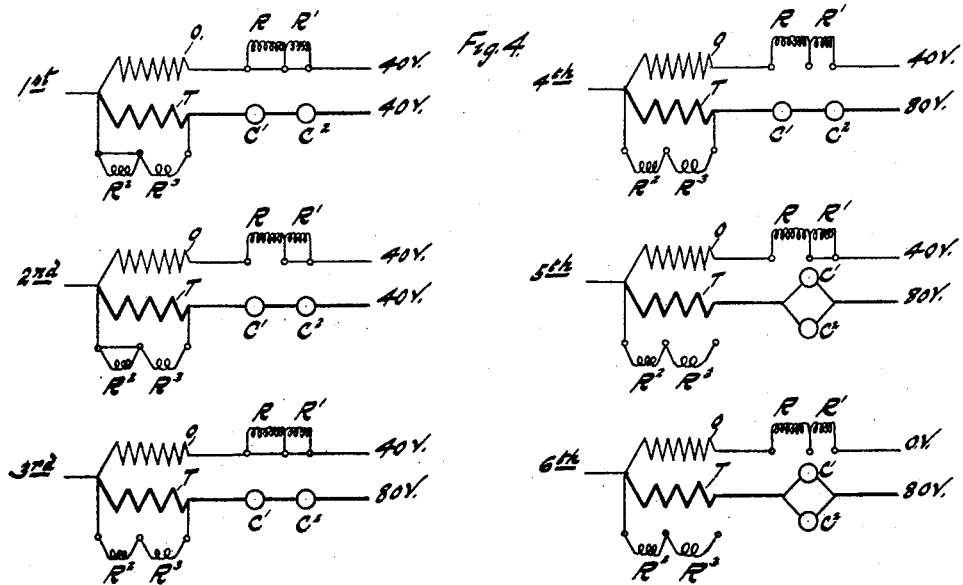
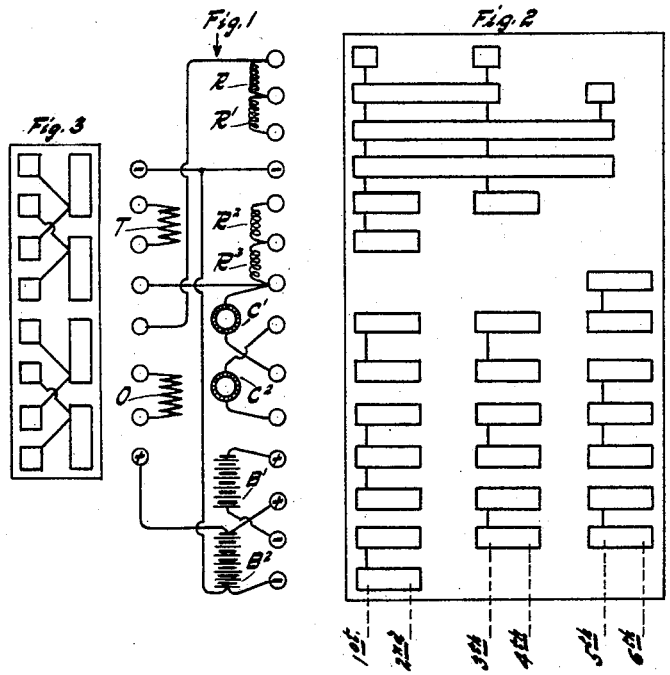
WITNESSES:  
M. F. Keating  
N. P. Cook
INVENTOR  
Robert Lundell  
BY Charles J. Kintner  
ATTORNEY No. 626,178. Patented May 30, 1899.
R. LUNDELL.
METHOD OF AND MEANS FOR REGULATING ELECTRIC MOTORS.
(Application filed Mar. 3, 1899.)
(No Model.) 2 Sheets—Sheet 2.

WITNESSES:
M. F. Keating
N. P. Cook.

INVENTOR
Robert Lundell
BY
Charles J. Kintner
ATTORNEY

UNITED STATES PATENT OFFICE.

ROBERT LUNDELL, OF NEW YORK, N. Y.

METHOD OF AND MEANS FOR REGULATING ELECTRIC MOTORS.

SPECIFICATION forming part of Letters Patent No. 626,178, dated May 30, 1899.

Application filed March 3, 1899. Serial No. 707,621. (No model.)

*To all whom it may concern:*

Be it known that I, ROBERT LUNDELL, a citizen of the United States, residing at New York, in the borough of Manhattan and State of New York, have made a new and useful Invention in Methods of and Means for Regulating Electric Motors, of which the following is a specification.

My present invention relates to improvements in methods of and means for the regulation of electric motors like those described by me in prior United States patents, Nos. 486,213 and 486,214, and to series-parallel motors in general.

It has for its objects, first, to devise a method of controlling electric motors of the type referred to by varying the field strength thereof in the manner hereinafter described and claimed; second, to provide means whereby all external resistance which will cause fall of potential at the armature-terminals can be dispensed with, particularly when the current changes from series to parallel are being effected; third, to so arrange the field and armature circuits that for the lower-speed combinations the motor may automatically become a differential dynamo capable of restoring energy to the source of current-supply and for the higher-speed combinations retain the qualities of a series-wound motor; fourth, to eliminate sparking at the brushes; fifth, to increase the efficiency of the apparatus to the highest possible limit by dispensing with all external resistances which will cause fall of potential at the armature-terminals and by restoring energy to the line as the controller is being moved from the positions of higher speed to those of lower speed.

It is customary to employ resistances in the armature-circuits of motors which are coupled in series-parallel combinations for the purpose of avoiding too sudden variations in speed, sparking at the brushes, and excessive flashing at the controller-contacts. These resistances are particularly necessary while the change from series to parallel is being effected. There are, however, serious objections to all armature-resistances, the chief objections being loss of efficiency and uneven drop of voltage between the resistance-terminals due to variations in the load. In fact, the resistances are only correct for one particular load upon the motor, as a light load will cause too small a drop of voltage in the resistance itself and a heavy load will cause a greater drop of voltage than is required for correct variations in speed.

Many attempts have been made to return current to the mains, most of which have proven abortive because effective only within a very limited speed range and because of excessive sparking at the brushes. The present invention makes it possible to do away with all external resistance which will cause fall of potential at the armature-terminals and to effectively return current to the line at all but the lowest speed by reason of the following novel construction of the motor and arrangement of its electric circuits.

Briefly expressed, the invention consists of an electric motor furnished with two armature-windings, two commutators, and a field-magnet so constructed that it will be possible to run with weak field strength without sparking at the brushes and with its electric circuits so arranged that before a current change from series to parallel is made the speed of the motor is so increased, by reason of the weakened field, that it will approximate the speed obtained with strong field after the change to parallel is effected.

For a clear understanding of the invention reference is made to the accompanying drawings, in which—

Figure 1 is a diagrammatic view of the circuit connections between the stationary contacts of a controller, a motor having two armature-windings and two commutators with a compound-wound field-magnet, a storage battery arranged in two distinct groups, and the resistances which are used in connection with the field-circuits of the motor. Fig. 2 illustrates the developed contacts upon the controller-cylinder, the construction of which is similar to well-known forms of controller-cylinders. Fig. 3 illustrates the developed contacts upon a reversing-cylinder of well-known form which serves to reverse the current through the field-windings of the motor. Fig. 4 is a diagrammatic view of the various combinations of the motor-circuits when the controller-cylinder, with its contacts shown in Fig. 2, is rotated over the stationary right-hand contacts shown in Fig. 1. The motor in this case is supposed to be used in connection with a divided storage battery, as indicated in Fig. 1, for the propulsion of electric vehicles or for similar uses. Fig. 5 is a diagrammatic view of the various circuit combinations when a motor having two armature-windings and two commutators with a compound-wound field-magnet is used in combination with another motor of like construction for electric tram or railway cars, nine conditions of usage being illustrated.

Referring again to Figs. 1 and 4, $C'$ and $C^2$ represent the commutators for the two armature-windings of the motor. O represents the shunt-field winding and T the series-field winding. $R, R', R^2$, and $R^3$ are resistances, the first two named being in series with the shunt-field winding or short-circuited, as the case may be, and the two latter being connected in series to the terminals of the series-field winding and partly short-circuited or disconnected, according to the position of the controller. The shunt-field is connected across one group of the batteries only for all positions of the controller, as shown in Fig. 1.

The first position of the controller or the first speed causes the shunt-field to become extra strong, the resistance in series with same being short-circuited. The series field is shunted by a low resistance $R^3$, so that the ampere-turns from same is reduced to a minimum. The storage battery (shown in Fig. 1) is in this position grouped in two parallel rows $B' B^2$, thus giving with two commutators in series only twenty volts per commutator—if, for example, each group of batteries is arranged to yield forty volts.

The second position of the controller leaves the circuit connections practically the same, with the exception of the shunt-field, which is so weakened by the field-resistance R that the motor has speeded up at least fifty per cent.

The third position of the controller has changed the batteries from parallel to series, giving forty volts per commutator, has caused the shunt-field to again reach maximum strength, and has also caused more current to flow through the series coil by reason of an additional resistance $R^2$ being introduced in series with $R^3$. This position gives to the motor a speed about one hundred per cent. greater than obtained at the first position.

Position four leaves the circuits practically the same as in the third position, with exception of the shunt-field circuit, which has been weakened by the two resistances R and R' to such an extent that although more current is now flowing through the series coil the total field has been so weakened that the motor has speeded up at least fifty per cent. from the last position.

Position five of the controller has changed the armature-circuits from series to parallel and is causing a strong current to flow through the series windings by reason of the resistances $R^2$ and $R^3$ being entirely cut out. The shunt-field is of the same strength as in position two and the total magnetization about the same as in position three. Each commutator is practically receiving eighty volts, and the speed is consequently about one hundred per cent. greater than at the third position.

The sixth and last position of the controller opens the shunt-field entirely, (or practically so,) but leaves the other circuits as they were in the fifth position, thus causing the motor to speed up and to become a plain series-wound motor.

Assuming now that the motor is used in connection with an electric vehicle, the following points will be clear from the above description of the circuits.

First, as the motor is gradually converted from practically a shunt-wound motor at the lowest speed to a series-wound motor at the top speed it follows that the speed of the vehicle will be practically constant at the lower speeds no matter what the load happens to be, but that the top speeds will greatly depend upon the load. In other words, the motor will at the lower speeds show a disposition to "fight" or take current through its armature-windings in proportion to the required torque. An excessive current will not cause sparking at the brushes for the reason that at the first and second positions of the controller the difference of potential between consecutive commutator-bars is only one-quarter of that at top speed.

Second, should the speed of the vehicle materially exceed the speed corresponding to a certain position of the controller No. 1, No. 2, or No. 3 by reason of running downhill, it follows that the motor will automatically become a dynamo and will thus restore energy to the battery.

Third, should the vehicle happen to be running at top speed and the controller to be rather quickly returned to positions No. 2 or No. 1, it follows that a rather excessive current will flow through the armature-windings, charging the battery, but that the same will be kept within safe limits on account of the weakening effect of the series field, which by reason of weakening of the field strength will correspondingly reduce the electromotive force of the armature. The charging of the battery is in a measure regulated automatically—viz., a heavy charging-current will weaken the field, and thus reduce the electromotive force, and a small charging-current will strengthen the field, and thus increase the electromotive force.

Figure 5 is a diagrammatic view of the various circuit combinations for two railway-motors of the described type. $O'$ represents the shunt-winding, $T'$ the series winding, and $C' O^2$ the commutators for the armature-windings of one motor. $O^2 T^2 C^3 C^4$ represent the corresponding windings and the commutators of the other motor. Each armature combination yields three different speeds by reason of a varied field strength.

The first three speed combinations (first, second, and third) give one hundred and twenty-five volts per commutator (with a line-voltage of five hundred) and the motors are practically working as shunt-motors, owing to the very strong shunt and the weak series-field winding. The next three speeds (fourth, fifth, and sixth) give two hundred and fifty volts per commutator. The series fields have now become considerably stronger owing to an increase of current through their windings, and the shunt-fields have been somewhat weakened by the introduction of one or more resistances in series with the same. The three last speed combinations (seventh, eighth, and ninth) give five hundred volts per commutator, not counting the drop due to the series-field winding. The series field at the seventh position is four times as strong as at the first position, and at the eighth and ninth positions it is furthermore strengthened by reason of more current flowing through the armature. The shunt-field has been so reduced by reason of additional resistances in series with the same that the motors at the top speed are practically working as plain series-wound motors. As there is no external resistance in the armature-circuits to cause a considerable drop of potential and as the internal resistances of the motors themselves are comparatively small, it follows that the speed of the motors will principally depend upon their counter electromotive forces, which in turn depend upon the series-parallel grouping of the armature-windings and upon the field strength. It also follows from the above description of the various circuit combinations that the motors will not accelerate more rapidly when the controller is moved from the third to the fourth and from the sixth to the seventh positions than between any other two positions. (The speed at the third and sixth positions being so increased by reason of the weakened field that it approximates the speed at the fourth and the seventh positions.) The controller, with its contacts, (shown in Figs. 1, 2, and 3,) forms no part of the present invention and is only shown in order that the circuits may be traced.

I do not limit this invention to the particular details of construction and arrangement of circuits and circuit connections hereinbefore described and illustrated in the accompanying drawings for practicing the methods of operation hereinafter claimed. I believe it is broadly new with me to regulate an electric motor or a number of electric motors when used conjointly in series-parallel combinations without the aid of external resistances in the armature-circuits and in such manner that it or they will effectually return current to the mains at all speeds, excepting the lowest for which it or they is or are adapted to run, and in such manner as to obtain the best economic results therefrom, and my claims to this end hereinafter made are directed to the application of this generic principle without regard to the means by which the same is effected.

Having thus described my invention, what I claim, and desire to secure by Letters Patent of the United States, is—

1. The method of regulating one or more compound-wound electric motors which consists in grouping the armature-circuits in series-parallel combinations and in changing the field-magnet strength from a strong shunt and weak series for the lower-speed combinations to a weak shunt and strong series for the higher-speed combinations.

2. The described method of increasing the speed of one or more electric motors which consists in changing the armature-circuits from series to parallel and in increasing the ratio of series ampere-turns to shunt ampere-turns upon the field after such a change is effected.

3. An electric motor or motors provided with means such as variable resistances for diverting part of the field-current before the armature-circuits are changed from series to parallel and for increasing the field-currents before the armature-circuits are changed from parallel to series, so that the speed obtained with weak field and armature circuits in series will closely approximate the speed obtained with strong field and armature circuits in parallel, substantially as described.

4. An electric motor provided with multiple field and armature windings, in combination with variable resistances, in a shunt around one set of field-windings, and additional variable resistances adapted to be placed in series relation with the other set of field-windings, substantially as described.

5. An electric motor or motors having compound-wound field-magnets, in combination with means such as variable resistances for reducing the field strength before the armature-circuits are changed from series to parallel and for increasing the ratio of series ampere-turns to shunt ampere-turns after such a change is effected, substantially as described.

6. An electric motor provided with double field-magnet and double armature windings, the armature-windings being in series relation with one set of field-windings having variable resistances located in shunt relation thereto; the other set of field-windings being located in series relation with variable resistances, together with circuit connections whereby the field-magnet strength may be varied in such manner that the armature will restore or return electrical energy to the source of current-supply for the lower-speed combinations of the motor, and will cause it to retain the qualities of a series-wound motor for the higher-speed combinations thereof, substantially as described.

7. Two or more electric motors provided each with multiple field and armature windings, in combination with two sets of variable resistances, one of which is adapted to be connected in series relation with one set of the field-windings of each motor, and the other in shunt relation to the other sets of field-windings of all of the motors, together with circuit connections for connecting the armature-windings of all of the motors to the last-named field-windings, in any desired order, substantially as described.

In testimony whereof I have hereunto subscribed my name this 2d day of March, 1899.

ROBERT LUNDELL.

Witnesses:
CHARLES J. KINTNER,
M. F. KEATING.